(12) United States Patent
Stratz et al.

(10) Patent No.: US 11,487,642 B2
(45) Date of Patent: Nov. 1, 2022

(54) METHOD FOR VERIFYING SOFTWARE

(71) Applicant: Robert Bosch GmbH, Stuttgart (DE)

(72) Inventors: Alexander Stratz, Unterreichenbach (DE); Mario Koenigshofer, Vienna (AT)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 17/176,994

(22) Filed: Feb. 16, 2021

(65) Prior Publication Data
US 2021/0263832 A1 Aug. 26, 2021

(30) Foreign Application Priority Data
Feb. 24, 2020 (DE) .................... 102020202303.4

(51) Int. Cl.
*G06F 11/36* (2006.01)
*G06F 8/75* (2018.01)

(52) U.S. Cl.
CPC ........... *G06F 11/3612* (2013.01); *G06F 8/75* (2013.01)

(58) Field of Classification Search
CPC ................. G06F 11/3612; G06F 8/75
See application file for complete search history.

(56) References Cited

U.S. PATENT DOCUMENTS

| | | | | |
|---|---|---|---|---|
| 7,461,040 B1* | 12/2008 | Goldman | ............. | G05B 13/048 706/45 |
| 2018/0276280 A1* | 9/2018 | Trudel | ................... | G06F 16/23 |
| 2018/0329408 A1* | 11/2018 | Schultalbers | ...... | G05B 23/0294 |
| 2019/0228505 A1* | 7/2019 | Douady-Pleven | ..... | H04N 9/735 |
| 2020/0327357 A1* | 10/2020 | Karnagel | ............. | G06K 9/6257 |
| 2021/0010902 A1* | 1/2021 | Breton | ..................... | G07C 5/02 |

OTHER PUBLICATIONS

Wikipedia: Softwaretest, 2020, pp. 1-33. (Machine Translation Provided.).

* cited by examiner

*Primary Examiner* — Wei Y Zhen
*Assistant Examiner* — Amir Soltanzadeh
(74) *Attorney, Agent, or Firm* — Norton Rose Fulbright US LLP; Gerard Messina

(57) ABSTRACT

A method for verifying an operating software block. The operating software block to be verified is defined based on an operating software. Function inputs and outputs corresponding to the operating software block are ascertained. A multi-dimensional parameter space is defined, each dimension of which corresponding to a function input of the operating software block. Input data tuples are formed based on predetermined rules, which correspond to points within specifiable limits of the parameter space. The operating software block is executed using the input data tuples in order to obtain output data, so that for every function output a dependency on the input data of the function inputs is ascertained. The dependency of the function outputs is compared with a specified standard dependency. A reaction is initiated based on a deviation between the dependency of a function output and the standard dependency.

15 Claims, 1 Drawing Sheet

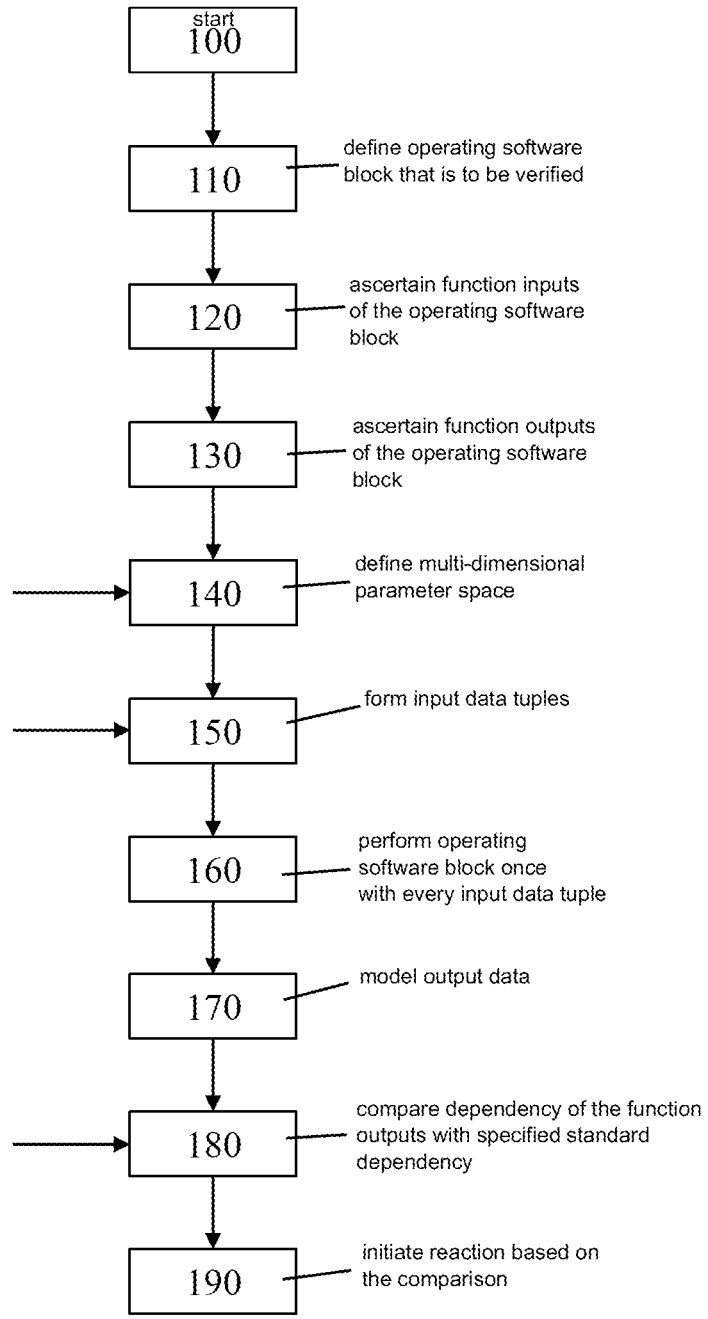

METHOD FOR VERIFYING SOFTWARE

CROSS REFERENCE

The present application claims the benefit under 35 U.S.C. § 119 of German Patent Application No. DE 102020202303.4 filed on Feb. 24, 2020, which is expressly incorporated herein by reference in its entirety.

FIELD

The present invention relates to a method for verifying an operating software block as well as to devices and computer programs designed for carrying out the method. Furthermore, the present invention relates to a method for operating a vehicle and to a vehicle.

BACKGROUND INFORMATION

Operating software may be used for operating motor vehicles for example in the form of software for engine control units. Software for engine control units is usually supplied with data within the scope of an application, i.e., characteristic curves, characteristics maps or variables are set to specific values. For this purpose, the engine of the vehicle or the entire vehicle are moved onto an engine test stand or roller test stand in order to ascertain the appropriate values to be input as data. To ensure the correct data input, a test is then performed, which must cover a wide spectrum of external environmental conditions in order to be sure that the vehicle exhibits a desired behavior even in external conditions that occur seldom such as, e.g., severe frost or great heat.

Verifying operating software via an engine test stand entails a number of disadvantages. In the case of a new generation of engines, an engine prototype must first be built, which entails great costs. Engine test stands are usually available in a pool and must be booked for testing individual engines or projects. Delays in the project work flow may have the consequence that an appointment on the engine test stand cannot be kept so that the assigned time frame for the engine test stand remains unused. This results in an ineffective capacity utilization of the test stand and thus in higher costs for testing. This may also jeopardize the progress of a project since it may necessitate waiting for a new test stand appointment. When verifying software via a test stand, it is necessary to assemble, disassemble and store an engine, which likewise increases the costs of the test. Delays caused by unfavorable availability of test stands possibly have to be compensated by increased personnel costs in subsequent steps in order to be able to maintain a time frame of a project. This may also entail higher costs. It is in particular disadvantageous that new versions of software to be verified may cause a prototype to behave in ways that damage parts of the prototype, that is, of the engine on the test stand. The resulting delay in the testing may be massive and entail substantial costs.

Due to the high complexity of engine control software, great expenditures are required to be able to optimize or predict the behavior of the functions of the engine control software. For example, normally a field test is necessary in order to determine whether an application of the engine control software is complete, that is, whether a desired behavior is exhibited even under rare environmental conditions, or whether there is a gap in the application. Checking the completeness of an application of an engine control software therefore often requires a testing program over a time span of several days.

SUMMARY

A method in accordance with an example embodiment of the present invention for verifying an operating software block, which comprises function inputs and function outputs, and which is designed to ascertain output data on the basis of input data representing physical parameters for the function inputs, may have the advantage that the operating software block to be verified is defined on the basis of an operating software, that function inputs corresponding to the operating software block are ascertained, that function outputs corresponding to the operating software block are ascertained, that a multi-dimensional parameter space is defined, each dimension of the multi-dimensional parameter space corresponding to a function input of the operating software block, that input data tuples are formed on the basis of predetermined rules, which correspond to points within specifiable limits of the parameter space, that the operating software block is executed using the entries of the input data tuples in order thus to obtain output data, so that for every function output a dependency on the input data of the function inputs is ascertained, that the dependency of the function outputs is compared with a specified standard dependency, and that a reaction is initiated in the event of a deviation between the dependency of a function output and the standard dependency.

Operating software is to be understood here in particular as software designed for the operation of a technical device. Operating software is in particular designed to determine, based on external variables such as, e.g., environmental conditions or input variables, an output variable, which in turn may be an input variable of a further technical device such as, e.g., an actuator.

The definition of the operating software block, based on the operating software, may signify for example that the operating software is taken over entirely as an operating software block. Alternatively, the definition of the operating software block, based on the operating software, may signify that the operating software block is cut free from the operating software. Within the scope of this advantageous refinement, the operating software block thus comprises a subset of the operating software. The operating software block is advantageously cut free in such a way that an active chain of the input data is entirely contained in the operating software block.

Using the example method of the present invention thus makes it possible to verify a complete active chain of the operating software without requiring a test extending over days for this purpose. Thus, is it possible to provide a method for verifying an operating software, which overcomes the disadvantages of the conventional method. A test program within a range of 160 hours on an engine test stand may thus be replaced by approximately 10 minutes of simulation. There is no risk of damaging parts of a prototype, and it is also possible to avoid the disadvantages and thus in particular the costs that result from the coordination of the availability of a test stand and a project progress.

Possible problems may be detected early so that by using the method according to the present invention it is possible to minimize the expenditure for the fabrication of prototypes, which are possibly needed for subsequent development or approval phases. Furthermore, it is possible to ascertain quickly and efficiently to what extent development expenditures of similar development projects may be reduced by using the results of the application of the method according to the present invention.

In accordance with an example embodiment of the present invention, it is advantageous that the operating software block is an operating software block of a motor vehicle and that the output data represent control variables for actuators of the motor vehicle. Within the scope of this advantageous development of the present invention, the operating software block may be for example a software for controlling an air supply of an internal combustion engine of the motor vehicle. The operating software may be for example the entire software provided for an engine control unit of the motor vehicle. The definition of the operating software block on the basis of the operating software may occur for example in such a way that all software modules that are relevant for the air supply to the internal combustion engine are cut free from the operating software in order thus to obtain the operating software block.

The function inputs that correspond to the operating software block may be for example an air temperature, an atmospheric pressure, an atmospheric humidity or similar physical variables. The function outputs that correspond to the operating software block may then be for example a throttle valve position, an air charge, an opening time of an intake valve, an EGR rate or the like. Within the scope of this exemplary embodiment, the multi-dimensional parameter space may be a three-dimensional space, which is generated by a temperature axis, a humidity axis and a pressure axis. The specifiable limits of the parameter space may be specified for example by physical boundary conditions. With regard to a pressure axis, the limits may be specified e.g., by atmospheric pressures typically prevailing on the earth's surface. With regard to a temperature axis, the limits may be specified, e.g., by air temperatures typically prevailing on the earth's surface, that is, e.g., by $-40°$ C. and $50°$ C. With regard to a humidity axis, the limits may be specified, e.g., by relative atmospheric humidities of 0% and 100%.

Within the scope of the aforementioned example, an input data tuple may be for example a value triplet composed of a temperature, an atmospheric pressure and a relative atmospheric humidity. For example, the value triplet ($20°$ C., 1013 hPA, 45%) may be an input data tuple. The term tuple is to be understood here as the mathematical object of a tuple. The number of the function inputs that generate the multi-dimensional parameter space corresponds to the dimensionality of the input data tuples.

The reaction that is initiated in the event of a deviation between the dependency of a function output and the standard dependency may be advantageously the transmission of a message within a communication network. This message may point for example an application engineer to an area of insufficient application. The message may also be used to signal, however, that the operating software block possibly does not conform to specified requirements such as, e.g., legal specifications. Thus, it is advantageously possible to check efficiently and quickly whether the operating software block adheres to legal specifications.

In accordance with an example embodiment of the present invention, it is advantageous that the operating software block to be verified is extracted from the operating software by using a source text analysis. In particular, when extracting the operating software block, it is possible to search the source text of the operating software for labels of individual software blocks. Such a label may be, e.g., a comment with the content "air system". Alternatively, it is also possible to analyze the source text of the operating software also semantically in automated fashion in order thus to identify, e.g., all software modules relevant for an air system and to form the operating software block from these.

In accordance with an example embodiment of the present invention, it is advantageous that all function inputs, which correspond to the operating software block, and all function outputs, which correspond to the operating software block, are ascertained.

In accordance with an example embodiment of the present invention, it is advantageous that the rules for forming the input data tuples provide for an equidistant distribution of the points within specifiable limits of the parameter space. In particular, it is possible for the rules for forming the input data tuples to provide that the points are equidistant with respect to every axis of the multi-dimensional parameter space.

In accordance with an example embodiment of the present invention, it is advantageous that the rules for forming the input data tuples provide for distributing the points within specifiable limits of the parameter space on the basis of a Gaussian distribution. Alternatively, the points may also be distributed on the basis of a Poisson distribution or another conventional distribution in mathematics. It is particularly advantageous to distribute the points in the parameter space in such a way that the density of the points is especially high in subsections of the parameter space that correspond to usual operating conditions of a motor vehicle on the earth's surface. For this purpose, it is possible for example to select the center and the width of a Gaussian distribution accordingly.

For the purpose of ascertaining the dependency of the function outputs on the input data of the function inputs, it is advantageous to model the output data. It is in particular advantageous to model the output data mathematically, for example by fitting a function and determining the parameters that describe the fit function. Alternatively or additionally, the dependency of the function outputs may be represented graphically and thus made accessible to optical analysis.

In accordance with an example embodiment of the present invention, it is advantageous that the specified standard dependency is taken from a set of regulations. The set of regulations may be in particular a technical standard or a set of regulations that is binding for legal reasons, such as, e.g., a law or an ordinance. Thus, the method according to the present invention may be used in particular in order to verify that a vehicle that is operated using an operating software block that was verified using the method of the present invention does not violate any statutory provisions.

In accordance with an example embodiment of the present invention, it is advantageous that the standard dependency is ascertained from operating data of comparison vehicles.

Advantageously, in accordance with an example embodiment of the present invention, a device is provided, which is designed to carry out every step of the method of the present invention, and a computer program is provided, which is designed to carry out every step of the method of the present invention when the computer program is executed on a processing unit.

Advantageously, in accordance with an example embodiment of the present invention, a method for operating a motor vehicle is provided, which comprises a processing unit, on which an operating software block is executed, the operating software block having been verified using the method according to the present invention.

Advantageously, in accordance with an example embodiment of the present invention, a motor vehicle is also provided, which comprises a processing unit, on which an operating software block is stored so as to be executable, the operating software block having been verified using the method according to the present invention.

The example method according to the present invention also makes it possible in particular to demonstrate a functional neutrality of a modification of the operating software. For this purpose, the method of the present invention is applied to an operating software block, which corresponds to the unmodified operating software, and to an operating software block, which corresponds to the modified operating software. If a comparison of the output data yields no deviation, then the functional neutrality of the modification of the operating software is proven. Advantageously, this makes it possible considerably to reduce the approval expenditure for modified software, in particular of motor vehicles.

An exemplary embodiment of the present invention is presented below.

BRIEF DESCRIPTION OF THE DRAWINGS

FIG. 1 shows a schematic representation of an exemplary embodiment of the method according to the present invention.

DETAILED DESCRIPTION OF EXAMPLE EMBODIMENTS

FIG. 1 shows a schematic representation of an exemplary embodiment of the method according to the present invention, which is applied to an engine control software of a motor vehicle. The exemplary embodiment of the method of the present invention begins with step 100. Subsequently, a step 110 is performed.

In step 110, the operating software block that is to be verified is defined on the basis of an operating software. For this purpose, a semantic analysis of the operating software is used to identify those software modules that are of interest for a desired active chain. In the example presented, all software modules that have an influence on the air supply of an internal combustion engine are identified and cut free so as to form the operating software block. Subsequently, a step 120 is performed.

In step 120, the function inputs of the operating software block cut free in step 110 are ascertained. In the example presented, these are a temperature, a pressure and a relative humidity of the ambient air. Subsequently, a step 130 is performed.

In step 130, the function outputs of the operating software block cut free in step 110 are ascertained. In the example presented, these may be, e.g., a throttle valve position, an air charge and an EGR rate. Finally, a step 140 is performed.

In step 140, the multi-dimensional parameter space generated by the function inputs ascertained in step 120 is defined. In the example presented, the parameter space is three-dimensional and includes a temperature axis, a pressure axis and a humidity axis. The limits for the parameter space may be specified. In the example presented, the temperature axis is limited by the values $-40°$ C. and $50°$ C. The pressure axis is limited by the values 400 hPa and 1100 hPa. The humidity axis is limited by the values 0% and 100%. Subsequently, a step 150 is performed.

In step 150, input data tuples are formed on the basis of specified rules, which correspond to points within the limits of the parameter space. The input data tuples are formed in particular so that the points in the parameter space are equidistant with regard to all axes. The rules for forming the input data tuples are specifiable so that the points may also be arranged in the parameter space in such a way that the density of the points with regard to every axis of the parameter space corresponds to a Gaussian distribution. Subsequently, a step 160 is performed.

In step 160, the operating software block cut free in step 110 is performed once with every input data tuple so that every entry of the respective input data tuple represents a value for a function input of the operating software block. Thus, step 160 is run through multiple times. Output data are thus obtained so that after running through step 160 multiple times a dependency on the input data of the function inputs is ascertained for every function output. Subsequently, a step 170 is performed.

In step 170, the output data of the function outputs ascertained in step 160 are modeled. For this purpose, e.g., every function output may be represented and modeled as a function of every function input. For example, the throttle valve position may be represented and modeled as a function of the temperature at a uniform pressure of 1013 hPa and a uniform relative humidity of 45%. Alternatively, every function output may be represented and modeled as a function of multiple function inputs. The throttle valve position may be represented and modeled, e.g., as a function of the pressure and of the temperature at a uniform humidity of 45%. Subsequently, a step 180 is performed.

In step 180, the dependency of the function outputs ascertained in step 170 is compared with a specified standard dependency. For example, a comparison may be performed to determine whether the throttle valve position as a function of the temperature corresponds to a standard throttle valve position. The standard throttle valve position may be ascertained, e.g., from data of comparison vehicles. Alternatively, the standard dependency may also be taken from a set of regulations. For example, the standard dependency may be taken from emission legislation, e.g., if one of the function outputs of the operating software block is an injection quantity of a urea solution, the quantity of urea correlating with a quantity of nitrogen oxide that is emitted by the internal combustion engine. Subsequently, a step 190 is performed.

In step 190, a reaction is initiated based on the comparison in step 180. This may be in particular a notification of a user, for example an applicator. In the context of the presented example, the notification may comprise, e.g., the information that in a temperature range from $-35°$ C. to $-25°$ C. the throttle valve position does not correspond to a standard throttle valve position, that is, to a desired throttle valve position.

Thereupon, the operating software block may be applied anew, and the method steps 100 through 190 may be repeated.

What is claimed is:

1. A method for verifying an operating software block, which includes function inputs and function outputs and which is configured to ascertain output data based on input data representing physical parameters for the function inputs, the method comprising the following steps:
   defining the operating software block that is to be verified based on an analysis of operating software;
   ascertaining the function inputs corresponding to the operating software block;
   ascertaining the function outputs corresponding to the operating software block;
   defining a multi-dimensional parameter space, each dimension of the multi-dimensional parameter space corresponding to a respective one of the physical parameters for the function inputs of the operating software block;

forming input data tuples based on predetermined rules, which correspond to points within specifiable limits of the parameter space;

executing the operating software block entries of the input data tuples to obtain output data, so that for every function output of the function outputs, a dependency on the input data of the function inputs is ascertained;

comparing the dependency of the function outputs with a specified standard dependency; and initiating a reaction based on a deviation between the dependency of a function output of the function outputs and the standard dependency;

wherein:
the defining of the multi-dimensional parameter space includes plotting for each of the physical parameters a set of values of a value range having a respective maximum value and a respective minimum value along a respective axis; and the forming of the input data tuples includes selecting a plurality of points that each is on every one of the axes according to a condition that:
for each of the selected points, a distance of the respective point along all of the axes is equal to one another; or
for each of the axes, a density of the selected points relative to the respective axis corresponds to a Gaussian distribution or Poisson distribution.

2. The method as recited in claim 1, wherein the operating software block is an operating software block of a motor vehicle and the output data represent control variables for actuators of the motor vehicle.

3. The method as recited in claim 1, wherein the operating software block to be verified is extracted from the operating software by using a source text analysis.

4. The method as recited in claim 1, wherein all of the function inputs, which correspond to the operating software block, and all of the function outputs, which correspond to the operating software block, are ascertained.

5. The method as recited in claim 1, wherein, for each of the axes, a density of the selected points relative to the axis corresponds to the Gaussian distribution.

6. The method as recited in claim 1, wherein for ascertaining the dependency of the function outputs on the input data of the function inputs, the output data is modeled.

7. The method as recited in claim 1, wherein the specified standard dependency is taken from a set of regulations.

8. The method as recited in claim 2, wherein the standard dependency is ascertained from operating data of comparison vehicles.

9. A device configured to verify an operating software block, which includes function inputs and function outputs and which is configured to ascertain output data based on input data representing physical parameters for the function inputs, the device comprising a processor, the processor being configured to:

define the operating software block that is to be verified based on an operating software;

ascertain the function inputs corresponding to the operating software block;

ascertain the function outputs corresponding to the operating software block;

define a multi-dimensional parameter space, each dimension of the multi-dimensional parameter space corresponding to a respective one of the function inputs of the operating software block;

form input data tuples based on predetermined rules, which correspond to points within specifiable limits of the parameter space;

execute the operating software block entries of the input data tuples to obtain output data, so that for every function output of the function outputs, a dependency on the input data of the function inputs is ascertained;

compare the dependency of the function outputs with a specified standard dependency; and initiate a reaction based on a deviation between the dependency of a function output of the function outputs and the standard dependency;

wherein:
the definition of the multi-dimensional parameter space includes plotting for each of the physical parameters a set of values of a value range having a respective maximum value and a respective minimum value along a respective axis; and the formation of the input data tuples includes selecting a plurality of points that each is on every one of the axes according to a condition that:
for each of the selected points, a distance of the respective point along all of the axes is equal to one another; or
for each of the axes, a density of the selected points relative to the respective axis corresponds to a Gaussian distribution or Poisson distribution.

10. A non-transitory computer-readable storage medium on which is stored a computer program for verifying an operating software block, which includes function inputs and function outputs and is configured to ascertain output data based on input data representing physical parameters for the function inputs, the computer program, when executed by a processing unit, causing the processing unit to perform the following steps:

defining the operating software block that is to be verified based on an operating software;

ascertaining the function inputs corresponding to the operating software block;

ascertaining the function outputs corresponding to the operating software block;

defining a multi-dimensional parameter space, each dimension of the multi-dimensional parameter space corresponding to a respective one of the function inputs of the operating software block;

forming input data tuples based on predetermined rules, which correspond to points within specifiable limits of the parameter space;

executing the operating software block entries of the input data tuples to obtain output data, so that for every function output of the function outputs, a dependency on the input data of the function inputs is ascertained;

comparing the dependency of the function outputs with a specified standard dependency; and initiating a reaction based on a deviation between the dependency of a function output of the function outputs and the standard dependency;

wherein:
the defining of the multi-dimensional parameter space includes plotting for each of the physical parameters a set of values of a value range having a respective maximum value and a respective minimum value along a respective axis; and the forming of the input data tuples includes selecting a plurality of points that each is on every one of the axes according to a condition that:
for each of the selected points, a distance of the respective point along all of the axes is equal to one another; or
for each of the axes, a density of the selected points relative to the respective axis corresponds to a Gaussian distribution or Poisson distribution.

11. A method for operating a motor vehicle, which includes a processing unit on which an operating software block is executed, the operating software block including function inputs and function outputs and is configured to ascertain output data based on input data representing physical parameters for the function inputs, the operating software block having been verified by performing the following steps:
defining the operating software block that is to be verified based on an operating software;
ascertaining the function inputs corresponding to the operating software block;
ascertaining the function outputs corresponding to the operating software block;
defining a multi-dimensional parameter space, each dimension of the multi-dimensional parameter space corresponding to a respective one of the function inputs of the operating software block;
forming input data tuples based on predetermined rules, which correspond to points within specifiable limits of the parameter space;
executing the operating software block entries of the input data tuples to obtain output data, so that for every function output of the function outputs, a dependency on the input data of the function inputs is ascertained;
comparing the dependency of the function outputs with a specified standard dependency; and
initiating a reaction based on a deviation between the dependency of a function output of the function outputs and the standard dependency;
wherein:
the defining of the multi-dimensional parameter space includes plotting for each of the physical parameters a set of values of a value range having a respective maximum value and a respective minimum value along a respective axis; and
the forming of the input data tuples includes selecting a plurality of points that each is on every one of the axes according to a condition that:
for each of the selected points, a distance of the respective point along all of the axes is equal to one another; or
for each of the axes, a density of the selected points relative to the respective axis corresponds to a Gaussian distribution or Poisson distribution.

12. A motor vehicle, comprising:
actuators; and
a processing unit on which an operating software block is stored so as to be executable, wherein the operating software block includes function inputs and function outputs and is configured to ascertain output data based on input data representing physical parameters for the function inputs, the operating software block having been verified by a device configured to:
define the operating software block that is to be verified based on an operating software;
ascertain the function inputs corresponding to the operating software block;
ascertain the function outputs corresponding to the operating software block;
define a multi-dimensional parameter space, each dimension of the multi-dimensional parameter space corresponding to a respective one of the function inputs of the operating software block;
form input data tuples based on predetermined rules, which correspond to points within specifiable limits of the parameter space;
execute the operating software block entries of the input data tuples to obtain output data, so that for every function output of the function outputs, a dependency on the input data of the function inputs is ascertained;
compare the dependency of the function outputs with a specified standard dependency; and
initiate a reaction based on a deviation between the dependency of a function output of the function outputs and the standard dependency;
wherein:
the output data represent control variables for the actuators;
the definition of the multi-dimensional parameter space includes plotting for each of the physical parameters a set of values of a value range having a respective maximum value and a respective minimum value along a respective axis; and
the formation of the input data tuples includes selecting a plurality of points that each is on every one of the axes according to a condition that:
for each of the selected points, a distance of the respective point along all of the axes is equal to one another; or
for each of the axes, a density of the selected points relative to the respective axis corresponds to a Gaussian distribution or Poisson distribution.

13. The method as recited in claim 1, wherein, for each of the selected points, the distance of the respective point along all of the axes is equal to one another.

14. The method as recited in claim 1, wherein, for each of the axes, a density of the selected points relative to the axis corresponds to the Poisson distribution.

15. The method as recited in claim 1, wherein the defining of the operating software block includes identifying all software operations in the operating software that affect a same defined manipulation of a machine operated by the operation software.

* * * * *